US008961651B1

(12) United States Patent
Gokturk (10) Patent No.: US 8,961,651 B1
(45) Date of Patent: Feb. 24, 2015

(54) REDUCTION OF AIR POLLUTION BY UTILIZING ELECTRON AFFINITY OF POLLUTANTS

(76) Inventor: Halit Gokturk, San Francisco, CA (US)

( * ) Notice: Subject to any disclaimer, the term of this patent is extended or adjusted under 35 U.S.C. 154(b) by 697 days.

(21) Appl. No.: 13/247,762

(22) Filed: Sep. 28, 2011

Related U.S. Application Data (60) Provisional application No. 61/389,007, filed on Oct. 1, 2010.

(51) Int. Cl.
*B03C 1/00* (2006.01)
*B03C 3/00* (2006.01)

(52) U.S. Cl.
USPC ........... 95/28; 95/57; 204/157.3; 422/186.04; 422/186.3; 96/3; 96/15; 96/16

(58) Field of Classification Search
CPC ............ B01D 53/323; B01D 21/0009; B03C 2201/14; H05H 11/00; H05H 13/00; H05H 13/10; H05H 15/00
USPC .................. 60/274–321; 95/28, 57; 96/15, 54
See application file for complete search history.

(56) References Cited

U.S. PATENT DOCUMENTS

| | | | | | |
|---|---|---|---|---|---|
| 4,071,334 A | * | 1/1978 | Kolb et al. | ......................... | 95/57 |
| 4,313,739 A | * | 2/1982 | Douglas-Hamilton | ........... | 95/79 |
| 6,709,490 B1 | * | 3/2004 | Calderon De Los Santos | .... | 96/3 |

FOREIGN PATENT DOCUMENTS

| | | | | | |
|---|---|---|---|---|---|
| JP | 63049225 A | * | 3/1988 | ............. | B01D 53/32 |
| JP | 63242320 A | * | 10/1988 | ............. | B01D 53/32 |

\* cited by examiner

*Primary Examiner* — Duane Smith
*Assistant Examiner* — Sonji Turner (57) ABSTRACT

Energy consumption of the society is increasing due to expanding economic activity and increasing population. As greater consumption of energy generates more air pollution, there is an ongoing need to find better methods of reducing pollutants in terms of effectiveness and reduced energy consumption. The solution proposed in this disclosure takes advantage of electrical characteristics such as electron affinity and dipole moment. There are many pollutants which exhibit positive electron affinity. Such a pollutant can be easily converted to a negative ion by providing an extra electron. Many of the pollutants have dipolar charge distributions which facilitate electrical interactions with charges. If one of the pollutants becomes charged, it can attract other pollutants which are dipoles to form clusters of pollutants. Furthermore, charged clusters are responsive to electric and magnetic fields. For example, they can be separated from the rest of the flue gas by manipulating with such fields.

20 Claims, 9 Drawing Sheets

REDUCTION OF AIR POLLUTION BY UTILIZING ELECTRON AFFINITY OF POLLUTANTS

This application claims the benefit of U.S. Provisional Application No. 61/389,007, filed on Oct. 1, 2010.

TECHNICAL FIELD

This disclosure relates generally to the reduction of pollutants which are generated during utilization of fossil fuels, biomass and waste. Utilization generally refers to combustion or incineration but it can also include processes such as gasification or refinement which does not involve burning. Fossil fuels which generate pollutants include coal, oil, natural gas and processed mixtures like gasoline or diesel. Recently there is a tendency to replace some fossil fuels with biomass such as forest residue or wood chips, because biomass is considered renewable. Waste is generally incinerated to conserve landfill space and to take advantage of the energy content, though it might contain a variety of unnatural constituents such as plastic. Burning of such fuels creates pollutants that include sulfur oxides ($SO_x$), nitrogen oxides ($NO_x$), mercury (Hg), other hazardous metals, organic pollutants, and particulate matter (PM) of various sizes.

Utilization of carbon containing fuels also generates carbon dioxide ($CO_2$) which is not a regulated pollutant. Scientific community is concerned that $CO_2$ accumulation in the atmosphere might be impacting the climate through global warming. Therefore reduction of greenhouse gases like $CO_2$ is another objective of this disclosure.

Polluted air which can also include $CO_2$ is referred to as flue gas in the disclosure.

BACKGROUND ART

Environmental regulations restrict emissions of most of the pollutants such as sulfur oxides, nitrogen oxides, mercury and particulate matter. A number of methods have been developed in order to reduce them to within limits permitted by the regulations [Ref. 1-5]. Typically flue gas is treated in three separate steps to reduce $NO_x$, $SO_x$ and PM.

Step 1. Reduction of nitrogen oxides: Ammonia gas ($NH_3$) is injected into the flue gas which reacts with NOx as follows:

$$4NO+4NH_3+O_2 \rightarrow 4N_2+6H_2O \quad \text{Eq. 1}$$

$$2NO_2+4NH_3+O_2 \rightarrow 3N_2+6H_2O \quad \text{Eq. 2}$$

These reactions require high temperatures around 300 degree C. Addition of catalysts increases the effectiveness of the treatment but increases the complexity of the system, as well.

Step 2. Reduction of particulate matter: PM refers to clusters of mineral matter and unburned fuel that are entrained in the flue gas. PM is typically reduced by an electrostatic precipitator (ESP). ESP creates an electric discharge by applying a high voltage of the order of 10 kV between a wire electrode and a plate shaped collection electrode. The ionized gas imparts electrons to some of the particulates which are forced towards the collection electrode under the influence of the electric field. Particulates lose their charges at the grounded electrode. Those which are heavy enough settle into the collection hopper placed under the electrode.

Step 3. Reduction of sulfur oxides: The flue gas goes through a shower of lime slurry, $Ca(OH)_2$, which converts $SO_2$ to calcium sulfite ($CaSO_3$). Calcium sulfite can be further processed to hydrous calcium sulfate to take advantage of its commercial value.

$$SO_2+Ca(OH)_2 \rightarrow CaSO_3+H_2O \quad \text{Eq. 3}$$

$$CaSO_3+2H_2O+O \rightarrow CaSO_4.2H_2O \quad \text{Eq. 4}$$

Reduction of mercury: Mercury exists in fossil fuels bound to elements such as sulfur. During the combustion, some of the mercury burns or reacts with other elements in the chamber. Mercury compounds which can be found in the flue gas are mercury oxide (HgO), mercuric chloride or bromide ($HgCl_2$, $HgBr_2$), and mercuric sulfate ($HgSO_4$). The treatment methods described above for $NO_x$, $SO_x$ and PM also reduce such mercury compounds. What is emitted at the stack is mostly elemental mercury which can be treated further with additional methods, if necessary.

Prior methods include several multi-pollutant control technologies which use electrical means similar to the current disclosure. These methods will be summarized in order to distinguish what is proposed in this disclosure from the prior art.

Electron beam irradiation (U.S. Pat. No. 5,041,271): This method involves irradiation of the flue gas with high energy electrons while water is added to counteract the rise in temperature. Energetic electrons create oxygen atoms and hydroxyl (OH) radicals which react with $NO_x$ and $SO_x$ in the gas. The presence of water leads to formation of nitric acid and sulfuric acid. Ammonia is injected into the gas to convert these acids to ammonium nitrate and ammonium sulfate.

Electro-catalytic oxidation (U.S. Pat. No. 5,871,703): Main objective of this process is the oxidation of gaseous pollutants in a barrier discharge reactor. The reactor generates a discharge between two electrodes one of which is covered with a dielectric in order to limit the current flow. A high voltage is necessary to cause the gases to break down to generate electrons. Energetic electrons collide with the oxygen and water molecules to generate oxygen atoms and hydroxyl radicals which oxidize $NO_x$, $SO_x$ and mercury pollutants. Oxidized pollutants are collected by a wet ESP placed at the exit.

Plasma enhanced electrostatic precipitator (U.S. Pat. No. 6,365,112): In this method an ESP is modified by including a corona discharge needle at the center of the ESP. A reagent gas suitable for generating a plasma is injected into the ESP through the needle. A typical example of a reagent gas is a mixture of oxygen molecules ($O_2$) and water vapor ($H_2O$). The plasma generates chemically active species including oxygen atoms, ozone ($O_3$) and hydroxyl (OH) radicals. These species react with $NO_N$, $SO_N$, incompletely burned organics and mercury in the flue gas. The resultant molecules are collected by the ESP.

The common themes in the electrical methods described above are as follows:
- Molecules in the flue gas or a reagent gas are ionized by removing electrons and molecular bonds are broken by energetic electrons,
- Chemically active species such as oxygen atoms are generated,
- Those species react with the pollutants, for example oxidizing them,
- Oxidized pollutants are further processed by reacting them with water or other chemicals introduced into the treatment system,
- Because a lot of energy is required to remove electrons from neutral molecules and to break up molecules, energy consumption of these methods are high.

SUMMARY OF INVENTION

Technical Problem

Energy consumption of the society is increasing due to expanding economic activity. As greater consumption of energy generates more pollution, restrictions imposed on pollutants are getting more stringent. For example on Jul. 6, 2010 Environmental Protection Agency proposed a new rule that would require 50% reduction in nitrogen oxides and 70% reduction in sulfur oxides emitted from power plants as compared to 2005 levels [Ref. 6].

Although there are many methods developed to reduce such pollutants, there is an ongoing need to find better methods of reducing air pollution in terms of effectiveness and reduced energy consumption.

In addition to the well known pollutants like nitrogen oxides, scientific understanding of global warming is giving rise to a need to restrict new exhaust gases such as carbon dioxide. It is necessary to develop new methods which can cope with potential new targets.

Solution to Problem

The solution proposed in this disclosure takes advantage of electrical characteristics such as electron affinity (eA) and dipole moment (Dm). There are many pollutants which exhibit positive eA (eA>0). Such a pollutant can be easily converted to a negative ion by providing an extra electron. Many of the pollutants have dipolar charge distributions which facilitate electrical interactions with charges. If one of the pollutants becomes charged, it can attract other pollutants which are dipoles to form clusters of pollutants. Furthermore, charged clusters are responsive to electric and magnetic fields. For example, they can be separated from the rest of the flue gas by manipulating with such fields.

An overview of the method disclosed here is illustrated in FIG. 1. What is proposed is a multi-pollutant reduction method which involves:

1) Providing electrons to those pollutant molecules which can accept extra electrons by virtue of having a positive electron affinity,
2) Allowing the charged pollutants to float through the flue gas without losing the charged state,
3) Letting the charged pollutants electrically attract other pollutants in the flue gas to form charged clusters,
4) Separating these clusters from the rest of the flue gas by manipulating them with electric and/or magnetic fields,
5) Neutralizing the pollutants via reactions with other molecules which exist in the clusters or with new molecules introduced into the process.

Charging process mentioned above is accomplished primarily by utilizing non-electrical and unused energy such as solar radiation or excess heat generated in a combustion process. For example electrons are provided into the flue gas by thermionic emission from a metal which is in thermal contact with the combustion chamber. Emitted electrons do not have to be energetic, since pollutants which have positive eA acquire them without effort. Electrons which contribute to charging do not even have to be free electrons. For example a photocatalyst which has an excited electron can donate it to a pollutant which comes in contact with the photocatalyst. Excited electrons can be created by exposing the photocatalyst, for example, to solar radiation.

Advantageous Effects of Invention

1) Removing multiple pollutants with one charged pollutant: The proposed method is self amplifying where one charged pollutant can attract and capture other pollutants in the flue gas. Each pollutant does not have to have a positive eA and does not have to be individually charged.

2) Creating stable scavengers which have long lifetimes: Molecules which have positive eA become relatively stable when they acquire extra electrons. They can maintain the charged state for an extended period of time provided they do not encounter, for example, a metal surface which can dissipate the charge. Long lifetime is advantageous to scavenge more of the pollutants in the flue gas.

3) Low energy charging processes: This disclosure promotes thermal or optical methods of charging in order to take advantage of unused energy. For example combustion of fuels creates thermal energy at high temperatures which can be used to operate a thermionic emitter. Likewise an optical method of charging is suggested in order to take advantage of solar radiation. These approaches reduce the energy that needs to be devoted to pollution control.

BRIEF DESCRIPTION OF DRAWINGS

FIG. 1. Illustration of the proposed method; (a) A flue gas stream containing pollutants flows in the direction of the arrow; (b) Some of the pollutants which have positive electron affinity get charged by a device which provides electrons to the flue gas; (c) Other pollutants cluster around the charged molecules; (d) Charged clusters are separated from the rest of the flue gas by electric/magnetic fields; (e) Molecules within the clusters undergo reactions with each other or by other chemicals introduced into the process.

FIG. 2. (a) Optimized geometry of a neutral carbon dioxide molecule interacting with a neutral sulfur monoxide molecule; (b) Optimized geometry of a neutral carbon dioxide molecule versus a sulfur monoxide minus ion.

FIG. 3. (a) Schematic drawing of a thermionic charging unit where the electron emitter is placed in thermal contact with a hot section of the combustion chamber; (b) Thermionic emitter of a fluorescent lamp.

FIG. 4. (a) Cross-sectional view of a photocatalytic charging unit along the axial direction; (b) Cross-sectional view of the same along the radial direction.

FIG. 5. (a) Schematic drawing of a pair of plate and wire electrodes of an electrostatic precipitator; (b) Plate electrode modified to a mesh structure to enable the charged particulates and molecules to go through; (c) Plate electrode modified to a grill structure to achieve the same objective.

FIG. 6. (a) Cross-sectional view of an electrified conduit along the axial direction; (b) Cross-sectional view of the same along the radial direction.

FIG. 7. (a) Cross-sectional view of a magnetic separation unit along the xz-plane; (b) Cross-sectional view of the same along the xy-plane.

DESCRIPTION OF EMBODIMENTS

Electron affinity (eA) is defined by International Union of Pure and Applied Chemistry as the energy required to detach an electron from a singly charged negative ion. Alternative definition is the energy released when an electron is attached to a neutral atom or molecule [Ref. 7]. Expressed mathematically:

$$eA = (\text{Energy of neutral state}) - (\text{Energy of negative ion}) \quad \text{Eq. 5}$$

Generally an unbonded neutral atom with empty shells can accommodate an additional electron and the atom becomes more stable as it acquires it. An example would be a hydrogen atom which can complete its lowest shell with the extra electron. Energy of the negative ion of hydrogen is lower than that of the neutral atom and eA is positive (~73 kJ/mol). Positive eA indicates that the atom is receptive to the addition of an extra electron.

In the case of molecules, they are generally formed so as to attain greater stability when atoms constituting a molecule share their electrons. Therefore most molecules have low energies in the neutral state as compared to the negative ion state. eA of molecules are generally negative.

There are some exceptions where a molecule can exhibit affinity for an extra electron. Two of the regulated pollutants, nitrogen dioxide ($NO_2$) and sulfur dioxide ($SO_2$) serve as examples of molecules which have positive eA.

Determination of Electron Affinity eA of common molecules such as oxygen gas ($O_2$) are well known, but not all of the eA values are readily available. Therefore eA of the molecules of interest were determined using first principle quantum mechanical calculations. The software used for the calculations is PQS version 3.3 from Parallel Quantum Solutions, Fayetteville Ark. (www.pqs-chem.com). Calculations were performed using the following method and basis sets:

Method: Density Functional Theory, B3LYP hybrid functional

Basis sets: Pople type split-valence (6-31G) basis set for light elements and Stuttgart-Cologne relativistic effective core potential (SRLC) basis set for heavy elements.

To calculate eA of a molecule two energy calculations need to be performed, one as a neutral molecule and the second as a negative ion as indicated in Eq. 1. eA of typical gases available in the atmosphere are given in Table 1.

TABLE 1

Electron affinity (eA) of typical gases

| | |
|---|---|
| Oxygen molecule ($O_2$) | eA = +0.6 eV |
| Nitrogen molecule ($N_2$) | eA = −1.5 eV |
| Carbon dioxide ($CO_2$) | eA = −0.9 eV |
| Water molecule ($H_2O$) | eA = −0.7 eV |
| Ozone molecule ($O_3$) | eA = +2.7 eV |
| Hydroxyl molecule (OH) | eA = +1.8 eV |

Nitrogen, water and carbon dioxide molecules have negative eA, whereas oxygen molecule has positive eA indicating that it is receptive to the addition of an extra electron. Ozone and hydroxyl molecules which are known to be highly reactive exhibit positive eA, as well.

eA of $NO_x$ and $SO_x$ molecules are given in Table 2. Except for nitrogen monoxide, $NO_x$ and $SO_x$ molecules exhibit positive eA.

TABLE 2

Electron affinity (eA) of nitrogen oxides and sulfur oxides

| | |
|---|---|
| Nitrogen monoxide (NO) | eA = −0.9 eV |
| Nitrogen dioxide ($NO_2$) | eA = +2.3 eV |
| Sulfur monoxide (SO) | eA = +1.3 eV |
| Sulfur dioxide ($SO_2$) | eA = +1.6 eV |
| Sulfur trioxide ($SO_3$) | eA = +1.2 eV |

Mercury in fossil fuels like coal is known to be a significant contributor to air pollution. Total amount of mercury emitted into the atmosphere by utilities alone amount to tens of tons per year. There are other impurities like lead, cadmium, arsenic, selenium and chromium which are similarly hazardous to human health and the environment. eA of the mentioned impurities were calculated assuming that each would be oxidized to the most common oxide form during the combustion process (Table 3). With the exception of arsenic, oxides of hazardous impurities have positive eA.

TABLE 3

Electron affinity (eA) of the oxides of elemental impurities which can be found in fossil fuels

| | |
|---|---|
| Mercury oxide (HgO) | eA = +2.4 eV |
| Cadmium oxide (CdO) | eA = +2.4 eV |
| Lead oxide (PbO) | eA = +0.4 eV |
| Arsenic oxide ($As_2O_3$) | eA = −0.9 eV |
| Selenium oxide ($SeO_2$) | eA = +1.6 eV |
| Chromium oxide ($Cr_2O_3$) | eA = +3.7 eV |

Particulate matter (PM) refers to clusters of mineral matter and unburned fuel that are entrained in the flue gas. eA of a particle cannot be calculated without knowing composition and structure. However ESP is known to be effective in reducing PM. The ability to collect PM with the help of an electrical discharge indicates that at least some of the PM have positive eA and that they are receptive to the free electrons generated during the discharge.

As can be seen from the above results, many pollutants of concern exhibit positive eA. By providing electrons to these pollutants, one can turn them into negative ions which can then scavenge other pollutants in the vicinity, including those which might not have positive eA.

It should be noted that oxygen molecule ($O_2$) which is not a pollutant exists in the flue gas in varying amounts. It has the potential to acquire a free electron and serve as a charged seed molecule. Although the presence of $O_2$ is not necessary for the proposed method, $O_2$ can contribute to the reduction of pollutants if it becomes charged.

Charge Distribution and Electronic Moment of Gas Molecules

Electrons of a molecule distribute themselves around the nuclei of atoms based on quantum mechanical principles. Distribution of electrons can be calculated using quantum mechanical methods and software mentioned above.

Electron distribution of a molecule consisting of identical atoms like nitrogen ($N_2$) or oxygen ($O_2$) is the same around each atom. Whereas electron distribution of a molecule consisting of different atoms like water molecule ($H_2O$) depend on the atom. For example nucleus of the oxygen atom attracts more of the electrons of a molecule, hence oxygen atom becomes negative and hydrogen atoms become positive. Quantum mechanical calculations of $H_2O$ give the following atomic charges expressed in terms of the charge of an electron, Qe (Qe~$1.6*10^{-19}$ coulomb):

TABLE 4

Atomic charges of H2O

| | |
|---|---|
| Oxygen | −0.78 Qe |
| Hydrogen | 0.39 Qe |

Electronic moments such as dipole moment (Dm) or quadrupole moment (Qm) of a molecule can be calculated from the charge distribution. Dm is a vector with three components. Qm is a 3*3 tensor with 9 components. Magnitude of Dm calculated for the molecules under consideration are given in Table 5 (expressed in terms of debye which is ~$3.3*10^{-30}$ coulomb-meter).

TABLE 5

Dipole moment (Dm) of various molecules of interest

| | |
|---|---|
| Nitrogen molecule ($N_2$) | Dm = 0 debye |
| Oxygen molecule ($O_2$) | Dm = 0 debye |
| Water molecule ($H_2O$) | Dm = 2.19 debye |
| Carbon dioxide ($CO_2$) | Dm = 0 debye |
| Nitrogen monoxide (NO) | Dm = 0.09 debye |
| Nitrogen dioxide ($NO_2$) | Dm = 0.36 debye |
| Sulfur monoxide (SO) | Dm = 1.79 debye |
| Sulfur dioxide ($SO_2$) | Dm = 2.00 debye |
| Sulfur trioxide ($SO_3$) | Dm = 0 debye |

$N_2$ and $O_2$ which constitute about 99% of the atmosphere have zero dipole moments and nearly zero quadrupole moments. Nitrogen oxides and sulfur oxides, except for $SO_3$, have dipolar charge distributions. One can take advantage of this difference when trying to distinguish the pollutants from $N_2$ or $O_2$. Generally electrical interaction between a charge and a dipole is stronger than that between a charge and a quadrupole.

Electrical Interactions Between Gas Molecules

This section is concerned with electrical interactions between molecules of interest either in neutral or charged state. These interactions do not include chemical reactions where composition of interacting molecules might change. Reactions will be taken up in a later section.

In order to quantify the strength of the electrical interaction between molecules, interaction energy between pairs of molecules has been calculated using the quantum mechanical methods and the software mentioned above. This calculation involves finding the optimal geometry of two chosen molecules which minimizes total energy. The software searches for optimal positioning of the atoms with respect to each other as well as optimal positioning of the molecules with respect to each other. After finding the optimal geometry, one would calculate the energy at zero interaction, that is when the molecules are infinitely apart. In practice the energy at zero interaction is the sum of the energies of the molecules calculated alone. Interaction energy (IE) is given by:

$$IE = (\text{Energy at zero interaction}) - (\text{Energy at optimal geometry}) \qquad \text{Eq. 6}$$

Thermal energy of hot gas molecules as they exit the combustion chamber at power plants is about 0.05 eV, assuming a flue gas temperature of about 300 degree C. If IE is comparable to the thermal energy, electrical interaction would not be effective. IE has to be much greater than thermal energy in order for two molecules to attract each other.

Interaction of Pollutants with Each Other

The most important interactions are those between pairs of pollutant molecules. It is desirable that once one of the pollutants is charged it can strongly interact with other pollutants, as well. Most of the pollutants are dipoles as explained above. Therefore the interaction is either a dipole versus dipole interaction in case of neutral molecules, or a dipole versus charge interaction in case one of the molecules is charged with an extra electron (-ion). IE of $NO_x$ versus $SO_x$ molecules are given in Table 6. Results indicate that, energy of interactions between neutral molecules are weak as compared to the thermal energy of the flue gas. Charging one of the molecules with an extra electron increases the interaction energy by more than an order of magnitude and IE becomes significantly greater than thermal energy. Hence one can conclude from these results that a charged pollutant molecule can attract other pollutant molecules in its vicinity.

TABLE 6

Energy of interaction (IE) between nitrogen oxides and sulfur oxides

| | |
|---|---|
| $SO_2$ vs $NO_2$ | IE < 0.05 eV |
| $SO_2$ vs $NO_2$-ion | IE ~ 0.9 eV |
| SO vs $NO_2$ | IE < 0.05 eV |
| SO vs $NO_2$-ion | IE ~ 0.6 eV |
| NO vs $SO_2$ | IE < 0.05 eV |
| NO vs $SO_2$-ion | IE ~ 0.5 eV |

Interaction of Carbon Dioxide with $NO_x/SO_x$ Molecules

Recently there is a lot of interest in sequestration of carbon dioxide emitted during the combustion of carbon based fuels. There is a consensus emerging among scientists that increasing levels of $CO_2$ in the atmosphere is giving rise to global warming and climate change. It is conceivable that emissions of $CO_2$ might be regulated similar to emissions of $NO_x/SO_x$ in the near future.

As explained above, $CO_2$ has a charge distribution which is a quadrupole, but charges around atoms are different. Atomic charges of neutral $CO_2$ obtained from quantum mechanical calculations are given in Table 7 (Qe~$1.6*10^{-19}$ coulomb).

TABLE 7

Atomic charges of CO2

| | |
|---|---|
| Carbon | 0.74 Qe |
| Oxygen | −0.37 Qe |
| Oxygen | −0.37 Qe |

Figure 1A:
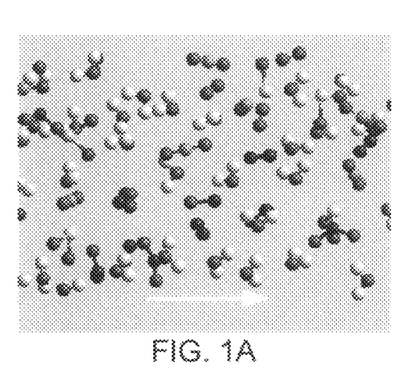
Figure 1B:
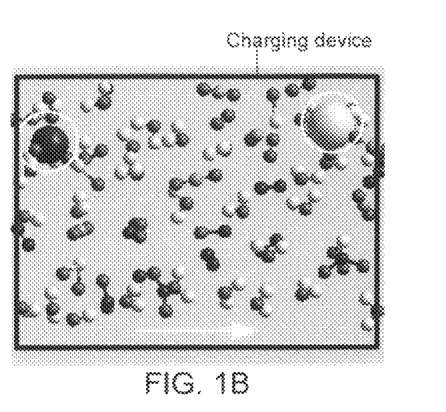
Figure 1C:
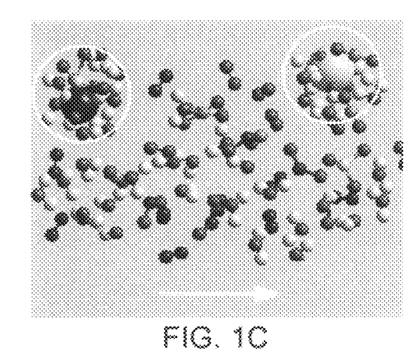
Figure 1D:
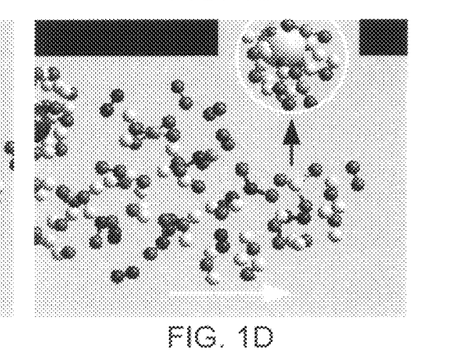
Figure 1E:
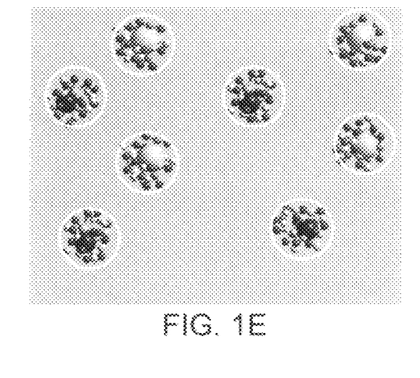
Figure 2A:
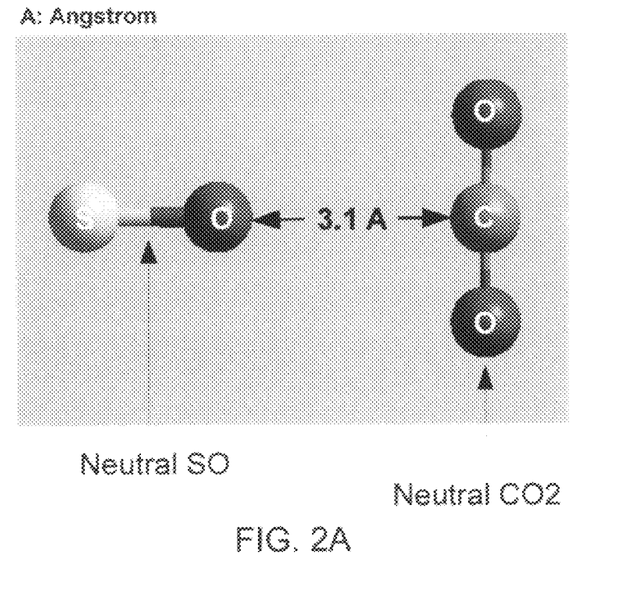
Figure 2B:
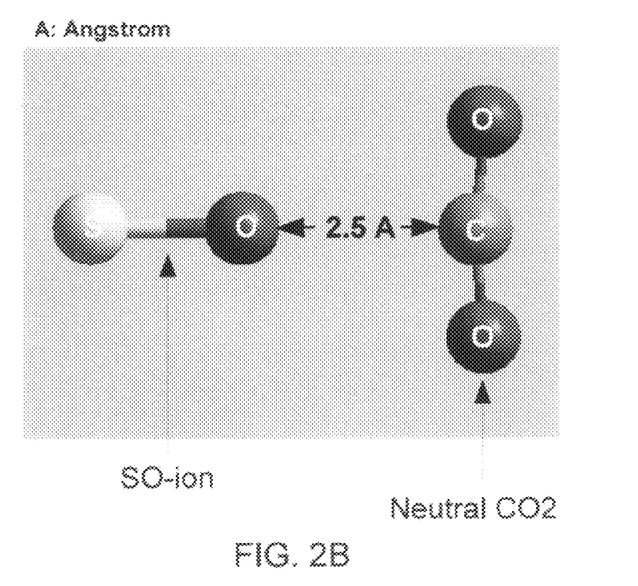

When $CO_2$ is in the vicinity of a minus ion, such as a negatively charged sulfur monoxide as shown in FIG. 2, positive carbon gets attracted to the minus ion and negative oxygens get repelled by it. $CO_2$ which is normally a linear molecule with a bond angle O—C—O of 180 degrees gets distorted into a shape similar to $H_2O$. For example the bond angle O—C—O in FIG. 2b is about 170 degrees. Electrical interaction between $CO_2$ and the minus ion is enhanced due to the induced dipolarization of CO2. Results given in Table 8 indicate that IE between $CO_2$ and charged pollutants is greater than the thermal energy by a factor of 6 or more. One can conclude that $CO_2$ molecules would be attracted to the charge similar to $NO_x/SO_x$ molecules.

TABLE 8

Energy of interaction (IE) between carbon dioxide ($CO_2$) and $NO_x/SO_x$

| | |
|---|---|
| $CO_2$ vs $NO_2$ | IE < 0.05 eV |
| $CO_2$ vs $NO_2$-ion | IE ~ 0.4 eV |
| $CO_2$ vs SO | IE < 0.05 eV |
| $CO_2$ vs SO-ion | IE ~ 0.3 eV |
| $CO_2$ vs $SO_2$ | IE < 0.05 eV |
| $CO_2$ vs $SO_2$-ion | IE ~ 0.3 eV |

Interaction of Nitrogen Molecule with $NO_x/SO_x$ Molecules

Nitrogen molecule ($N_2$) is the most abundant gas in the atmosphere, at about 78% by volume. When combustion of a fuel takes place in air, oxygen ($O_2$) gets consumed during the burning process, but $N_2$ does not. Therefore it remains as the most abundant gas in the exhaust of the combustion. Since $N_2$ is not a pollutant, interaction of $N_2$ with a charge should be weak to distinguish it from pollutants. Results given in Table 9 indicate that IE of $N_2$ versus charged $NO_2$ or $SO_2$ is comparable to the thermal energy (~0.05 eV). $N_2$ would not be able to cluster with charged molecules, since IE is too small to overcome thermal agitations.

TABLE 9

Energy of interaction (IE) between nitrogen molecule (N₂) and $NO_x/SO_x$

| | |
|---|---|
| $N_2$ vs $NO_2$ | IE < 0.05 eV |
| $N_2$ vs $NO_2$-ion | IE ~ 0.06 eV |
| $N_2$ vs $SO_2$ | IE < 0.05 eV |
| $N_2$ vs $SO_2$-ion | IE ~ 0.07 eV |

Interaction of Water Molecule ($H_2O$) with $NO_x/SO_x$ Molecules

Water molecules can enter the flue gas stream in a number of ways. The fuel can contain water; for example coal typically contains several percent of moisture. Air used for the combustion might entrain some humidity. The atmosphere can accommodate up to several percent of humidity. Water molecules can be formed during the combustion of hydrogen containing fuels. For example when methane gas burns, hydrogens bonded to methane dissociate and combine with oxygen to form water.

Charge distribution of water is a dipole with a relatively large dipole moment of about 2 debye. It can interact with charged molecules as well as with other dipoles in the flue gas. Results given in Table 10 indicate that IE of $H_2O$ versus neutral $NO_x/SO_x$ molecules is comparable to or less than the thermal energy of the flue gas. IE of $H_2O$ versus charged $NO_x/SO_x$ molecules is more than an order of magnitude greater than the thermal energy. Although water is not a pollutant, it would be attracted to charged molecules in the same way as the dipolar pollutants.

TABLE 10

Energy of interaction (IE) between water molecule (H2O) and $NO_x/SO_x$

| | |
|---|---|
| $H_2O$ vs $NO_2$ | IE < 0.05 eV |
| $H_2O$ vs $NO_2$-ion | IE ~ 0.8 eV |
| $H_2O$ vs $SO$ | IE ~ 0.1 eV |
| $H_2O$ vs $SO$-ion | IE ~ 0.7 eV |
| $H_2O$ vs $SO_2$ | IE ~ 0.1 eV |
| $H_2O$ vs $SO_2$-ion | IE ~ 0.8 eV |

Formation of Oxyacids within Clusters

One of the phenomena associated with $NO_x$ and $SO_x$ pollution is known to be acid rain where pollutant molecules released into the atmosphere interact with water molecules to form oxyacids, such as nitric acid ($HNO_3$) or sulfuric acid ($H_2SO_4$). The method proposed in this disclosure utilizes charged molecules to form clusters of $NO_x/SO_x$, $CO_2$, and other pollutants together with water. These clusters have the potential to serve as catalysts for oxyacid formation since they concentrate the reactants and bring them in close proximity. Typically acidification reactions occur as follows:

$$CO_2 + H_2O \rightarrow H_2CO_3 \text{ (carbonic acid)} \quad \text{Eq. 7}$$

$$3NO_2 + H_2O \rightarrow NO + 2HNO_3 \quad \text{Eq. 8}$$

$$SO_3 + H_2O \rightarrow H_2SO_4 \quad \text{Eq. 9}$$

The inclusion of water molecules into clusters of pollutants might seem detrimental to the cleaning process, but water helps convert the pollutants into oxyacids which can then be neutralized by reacting with a suitable base. Examples of acid-base reactions which use calcium hydroxide, $Ca(OH)_2$, as a base are as follows:

$$H_2CO_3 + Ca(OH)_2 \rightarrow 2H_2O + CaCO_3 \quad \text{Eq. 10}$$

$$2HNO_3 + Ca(OH)_2 \rightarrow 2H_2O + Ca(NO_3)_2 \quad \text{Eq. 11}$$

$$H_2SO_4 + Ca(OH)_2 \rightarrow 2H_2O + CaSO_4 \quad \text{Eq. 12}$$

Calcium compounds, such as calcium carbonate ($CaCO_3$), obtained as a result of the neutralization reactions are beneficial products which can be utilized in various industries.

Reactions Between Water Molecules and Charged Pollutants

Water versus $NO_x/SO_x$ reactions which were explained above assume that reactions occur between neutral molecules in the cluster. The cluster also contains a charged molecule which serves as the seed of the cluster. Reactions can also occur between a water molecule and the charged seed. Two examples of such reactions are given below:

$$H_2O + NO_2\text{-ion} \rightarrow H_2 + NO_3\text{-ion} \quad \text{Eq. 13}$$

$$H_2O + SO_3\text{-ion} \rightarrow H + HSO_4\text{-ion} \quad \text{Eq. 14}$$

The extra electron on the charged reactant serves the role of a hydrogen atom in the product. For example, $NO_3$-ion is obtained instead of $HNO_3$ in Eq. 13. As a result, these reactions yield excess hydrogens. The examples given above illustrate that hydrogen gas which is a beneficial product can be generated from the flue gas.

CHARGING METHODS

Electrons which contribute to charging of pollutants can be created using a number of different approaches including electrical breakdown of a neutral molecule, thermionic emission from a metal, optical excitation of a photocathode, triboelectrical charging, and the like. An important objective is to minimize electrical power necessary for the charging in order not to reduce the efficiency of power plants. Therefore charging methods which utilize unused energy such as excess heat generated during combustion or solar radiation are preferable over methods which use electrical energy.

Charging Example 1

Thermionic Charging

Basic principle of thermionic emission is the escape of electrons from a metal surface heated to a high enough temperature that energy of some of the electrons exceeds the work function of the metal. Typical operating temperatures are about 600-1000 degree C. which is within the range of temperatures obtained during the combustion of fuels. Thermionic emission is a mature technology widely used, for example, in cathode ray tubes or fluorescent lamps.

Figure 3A:
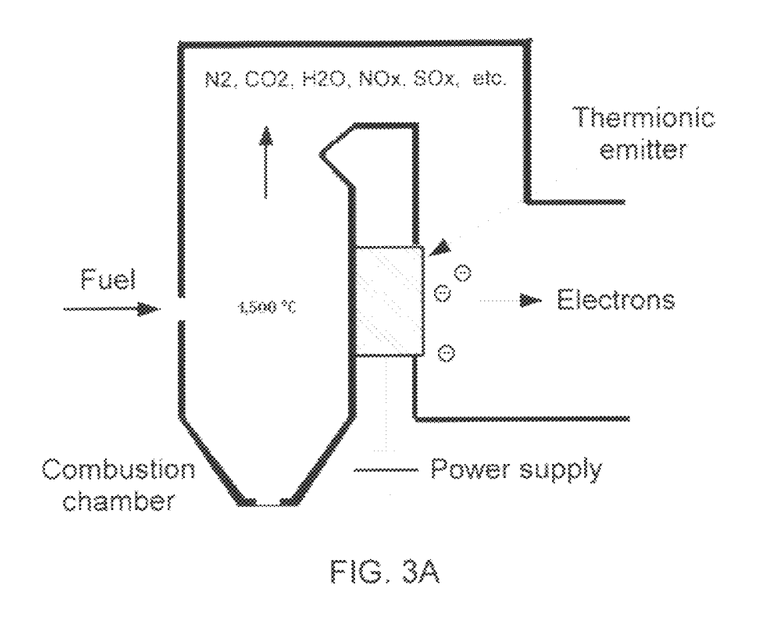

The thermionic charging unit (FIG. 3a) consists of an electron emitting metal placed in good thermal contact with a hot section of the combustion chamber. Tungsten is the preferred metal for the emitter because it can withstand high temperatures. Tungsten has a work function of about 4.5 eV which is somewhat large for thermionic emission. It is coated with a mixture of the oxides of strontium (SrO), barium (BaO), and calcium (CaO) in order to reduce the work function. The emitter is connected to a power supply in order to replenish the electrons which are lost in the thermionic process.

Figure 3B:
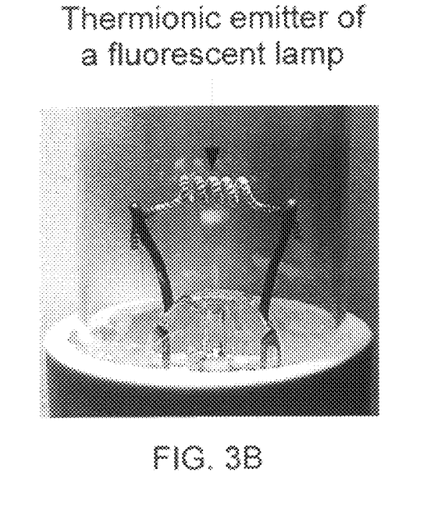

An alternative implementation would be to connect the electron emitting metal as a resistor and heat it to the desired operating temperature using the power supply. Such an approach is implemented, for example, in fluorescent lamps as shown in FIG. 3b.

Charging Example 2

Photocatalytic Charging

Photocatalysts are a special class of materials which are optically activated to perform catalytic functions. They are widely used in applications such as self cleaning of building surfaces, anti-fogging of mirrors, bacteria reduction in medical facilities, and the like [Ref. 8].

A typical photocatalyst is titanium dioxide ($TiO_2$) semiconductor which has an anatase type crystal structure. The material is available as a powder or dispersion which can be coated onto tiles, glass, etc. It is generally used as a thin coating of the order of 100 nm thickness. For example U.S. Pat. No. 6,387,844 describes a method of coating $TiO_2$ onto window glass in order to impart photocatalytic functionality to windows.

Anatase $TiO_2$ has a bandgap of ~3.2 eV. It can be excited by near UV (~390 nm) wavelengths which are available in the spectrum of sunlight. Absorption of a photon of energy equal to or greater than the bandgap generates electrons and holes. $TiO_2$ has the capability to donate the electrons excited to the conduction band to molecules on the surface. For example oxygen molecule ($O_2$) which is abundant in the atmosphere and which has a positive electron affinity receives an electron to become $O_2$-ion. If the photocatalyst is operated not in ambient air but in the flue gas, excited electrons can be donated to other molecules which have positive eA, such as $NO_2$ or $SO_2$.

The excited TiO2 also has the capability to withdraw electrons from other molecules to satisfy the hole in the valence band. Typically it withdraws an electron from a water molecule on the surface which releases the hydroxyl (OH) of water. OH is a well known scavenger of pollutants in air. For example it can react with nitrogen dioxide to form nitric acid.

$$OH + NO_2 \rightarrow HNO_3 \qquad \text{Eq. 15}$$

Hence, the photocatalyst can contribute to the reduction of pollutants not only by charging pollutant molecules but also by creating hydroxyl molecules as well.

Figure 4A:
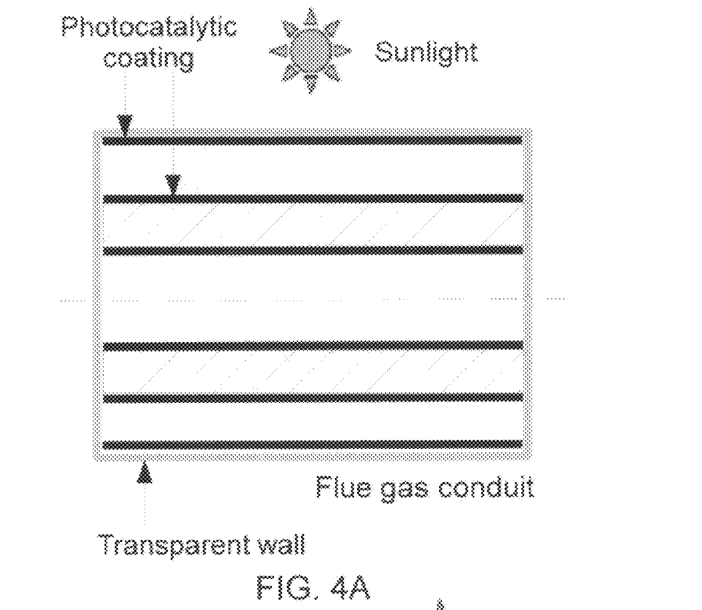
Figure 4B:
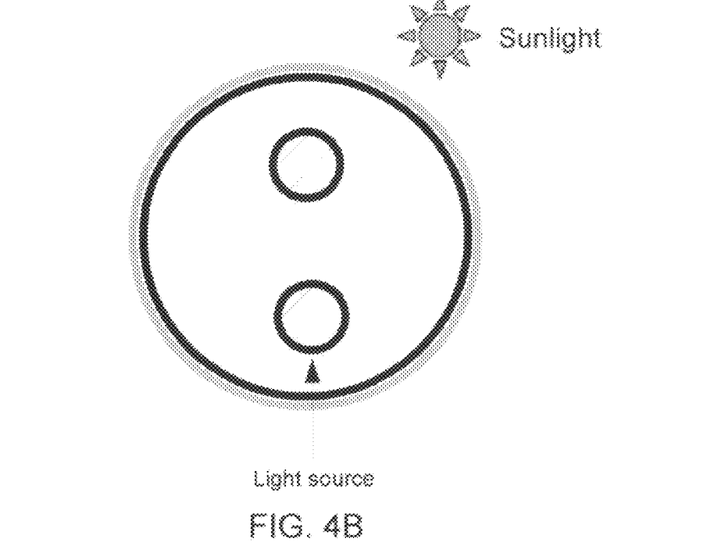

Photocatalytic charging unit (FIG. 4) consists of a photocatalyst coated surface in contact with the flue gas. A transparent section of the gas conduit allows sunlight to be incident on the photocatalyst. Optionally, a secondary light source which provides optical radiation when sunlight is not adequate or available can be installed. The secondary light source can be chosen as a fluorescent lamp without any phosphor coating to utilize ultraviolet emissions of the lamp. Glass envelope of the secondary light source can be coated with a photocatalyst to make maximum use of the optical radiation generated by the lamp.

Charging Example 3

Electrostatic Charging

One of the intended applications of the method proposed in this disclosure is to reduce pollutants from electric power plants. A power plant which generates particulate matter (PM) is generally equipped with an ESP to reduce PM emissions. A method of charging the pollutants by modifying the ESP is going to be described in case it might be advantageous to modify an existing device rather than installing a new device.

The operation of the ESP is briefly explained above. Its primary function is to create an ionized gas and to collect the PM which gets negatively charged at the ground electrode. The ground electrode is designed in the form of a plate of large surface area so that it can catch a large fraction of the charged PM.

The objective of the method proposed in this disclosure is to charge the pollutants, and to allow them to float within the flue gas to scavenge other pollutants. Therefore design of the ESP must be modified such that it does not collect the charged pollutants. One way of achieving this goal is to minimize the surface area of the ground electrode.

Figure 5A:
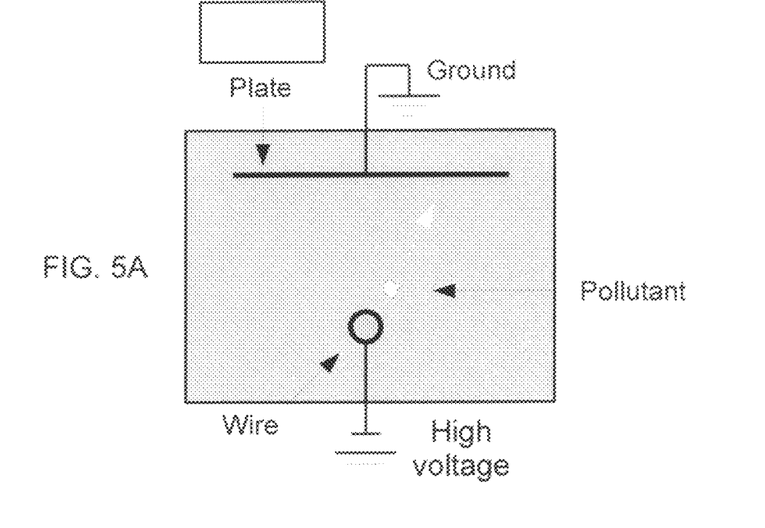
Figure 5B:
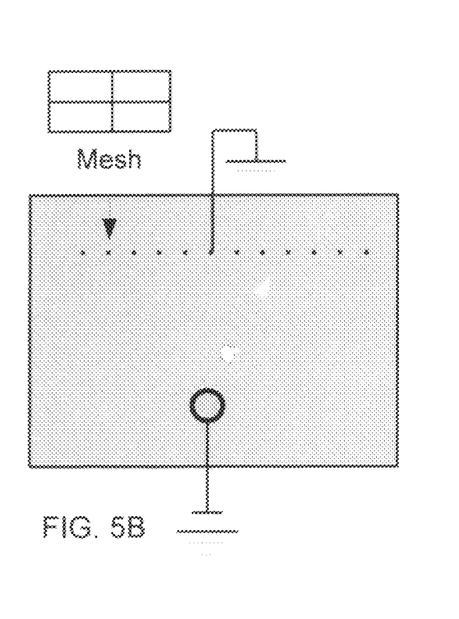
Figure 5C:
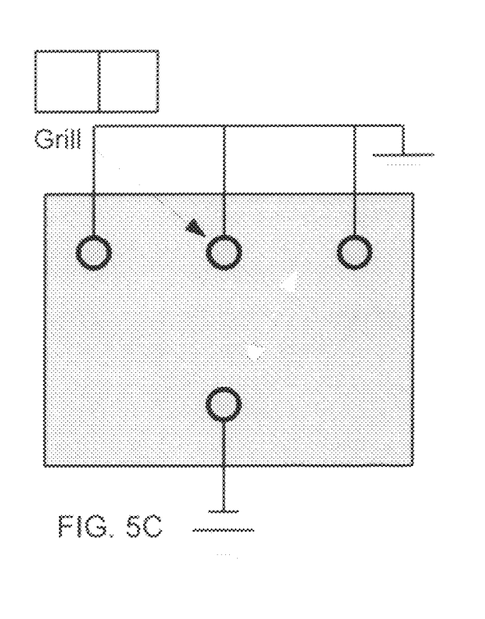

Minimal surface area can be realized by converting a solid plate electrode (FIG. 5a) to a mesh design (FIG. 5b) where the mesh is made of a wire of small diameter and has sufficiently large openings to let the charged pollutants pass through. Alternatively, the plate shaped ground electrode can be replaced by a grill consisting of a set of wires stretched parallel to the negative electrode (FIG. 5c).

Methods of Manipulating Charged Clusters

Once a pollutant molecule in the flue gas is charged by acquiring an electron, it needs to be treated with care so that the charge is not lost by accident. As the charged pollutant floats through the flue gas it attracts pollutants and grows into a cluster. Charge on the seed molecule serves like a glue which holds the cluster together. If the charge is lost somehow, the cluster would dissociate by thermal energy and pollutants would scatter back into the flue gas.

If the charged molecule or cluster comes in contact with a grounded metal surface, such as the walls of the gas conduit it would lose its charge. Therefore the charged molecule or cluster needs to be kept away from such surfaces as it floats in the flue gas.

One can apply an electric or magnetic field in order to manipulate the motion of a charge, q. Forces generated by electric and magnetic fields are expressed with the Lorentz equation:

$$\text{Force vector} = q(\text{Electric field}) + q(\text{velocity vector})\char`\^(\text{Magnetic field}) \qquad \text{Eq. 16}$$

where ^ stands for vector multiplication. Accordingly, an electric field of magnitude E would apply a force of magnitude qE in the direction of the field. A magnetic field would apply a force to a moving charge in a direction perpendicular to both the magnetic field and the direction of motion. For example a charge moving along the z-axis with a velocity of v, through a magnetic field B along the y-axis would feel a force of magnitude qvB along the x-axis.

1. Electric Field Example

Electrified Conduit

The function of the electrified conduit is to keep the charged clusters away from the wall. It is assumed that the clusters are moving through the conduit in the axial direction along with the rest of the flue gas and velocity in the radial direction is small and random.

Figure 6A:
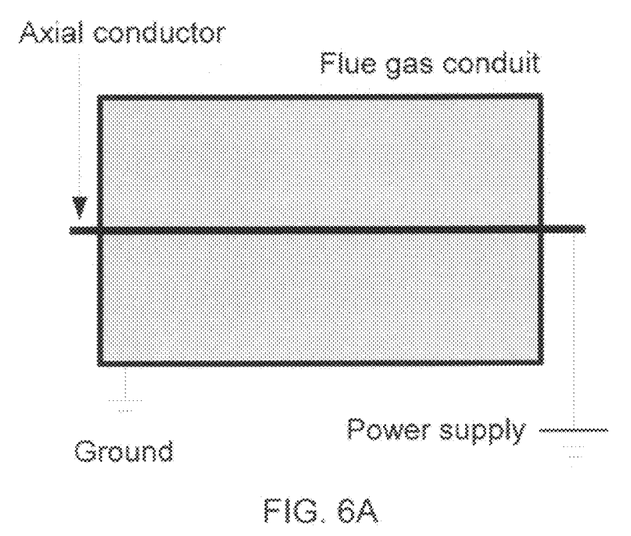
Figure 6B:
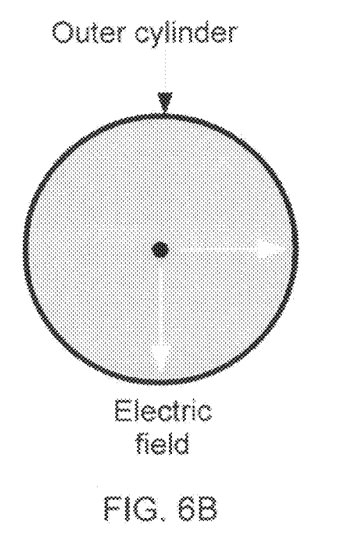

A radial electric field is set up by applying a voltage between a conductor on the axis of the cylinder and a metallic outer cylinder as shown in FIG. 6. Electric force acting on the negatively charged clusters must be approximately radial pointing towards the axis. Connecting the axial conductor to positive voltage and the outer cylinder to ground provides the desired electric field. Surface area of the axial conductor needs to be minimized to decrease the chances of charged molecules coming in contact with it. Therefore the diameter of the axial wire must be as small as practical.

2. Magnetic Field Example

Magnetic Separation Unit

The function of the unit is to separate pollutant clusters from the rest of the flue gas. It is assumed that charged clusters are moving parallel to the axis (z-axis) of the conduit along with the rest of the flue gas at an average velocity of vz and velocity along the x and y axes (vx & vy) are small and random.

Figure 7A:
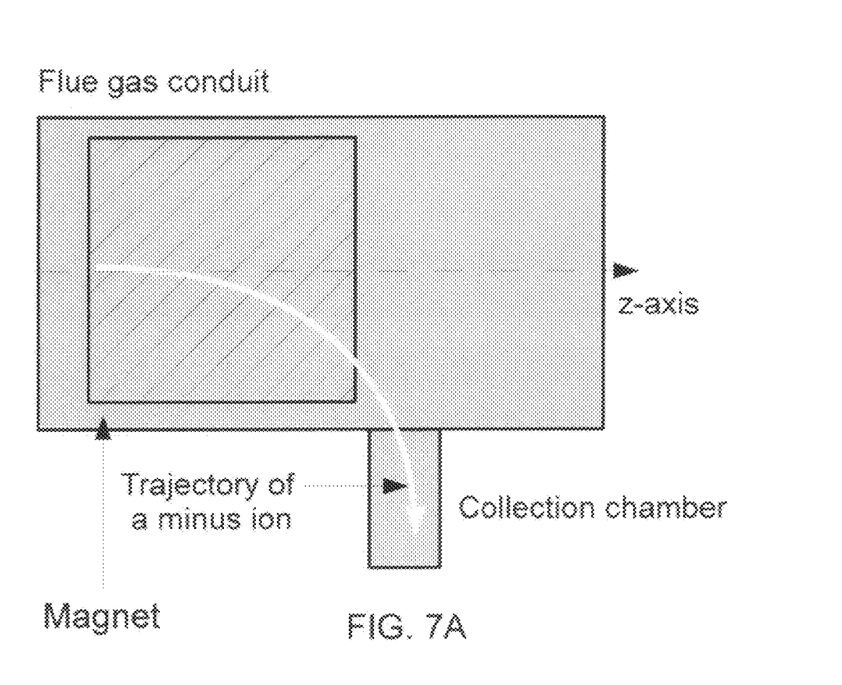
Figure 7B:
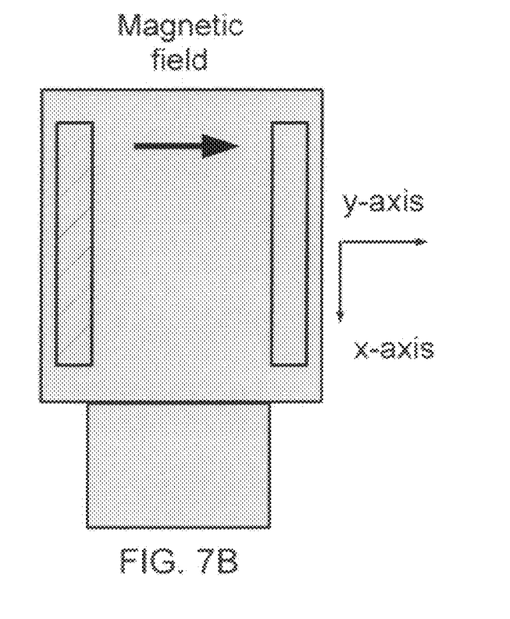

A magnetic field is applied along the y-axis, using for example permanent magnets as shown in FIG. 7, so that the charged cluster feels a net force along the x-axis. Velocity of the cluster changes from vz only to vz and vx. The cluster follows an arc in the xz plane heading towards the wall of the conduit. By providing an opening at the wall, charged clusters can be separated from the rest of the flow and collected into a neutralization chamber where they can be further processed into beneficial compounds as explained above.

The force acting on the charged cluster along the x-axis can be increased by applying an electric field in the x direction in addition to the magnetic field. Separation can be accomplished by applying an electric field alone, as well.

INDUSTRIAL APPLICABILITY

Industrial applications can be broadly classified into two areas:
1) An industrial process that generates a high concentration of pollutants which need to be cleaned before the exhaust of the process is released into the atmosphere. A good example is a power plant which generates electricity from fossil fuels like coal.
2) Air pollution which is generated by a large number of small emitters concentrated in a relatively small area. A good example is a populated urban area where emissions from commercial buildings and heavy vehicular traffic create air pollution problems like smog.

Examples given below are chosen to illustrate how the proposed method can be implemented in such cases to handle the pollutants.

Industrial Application Example 1

Power Plant

Figure 8:
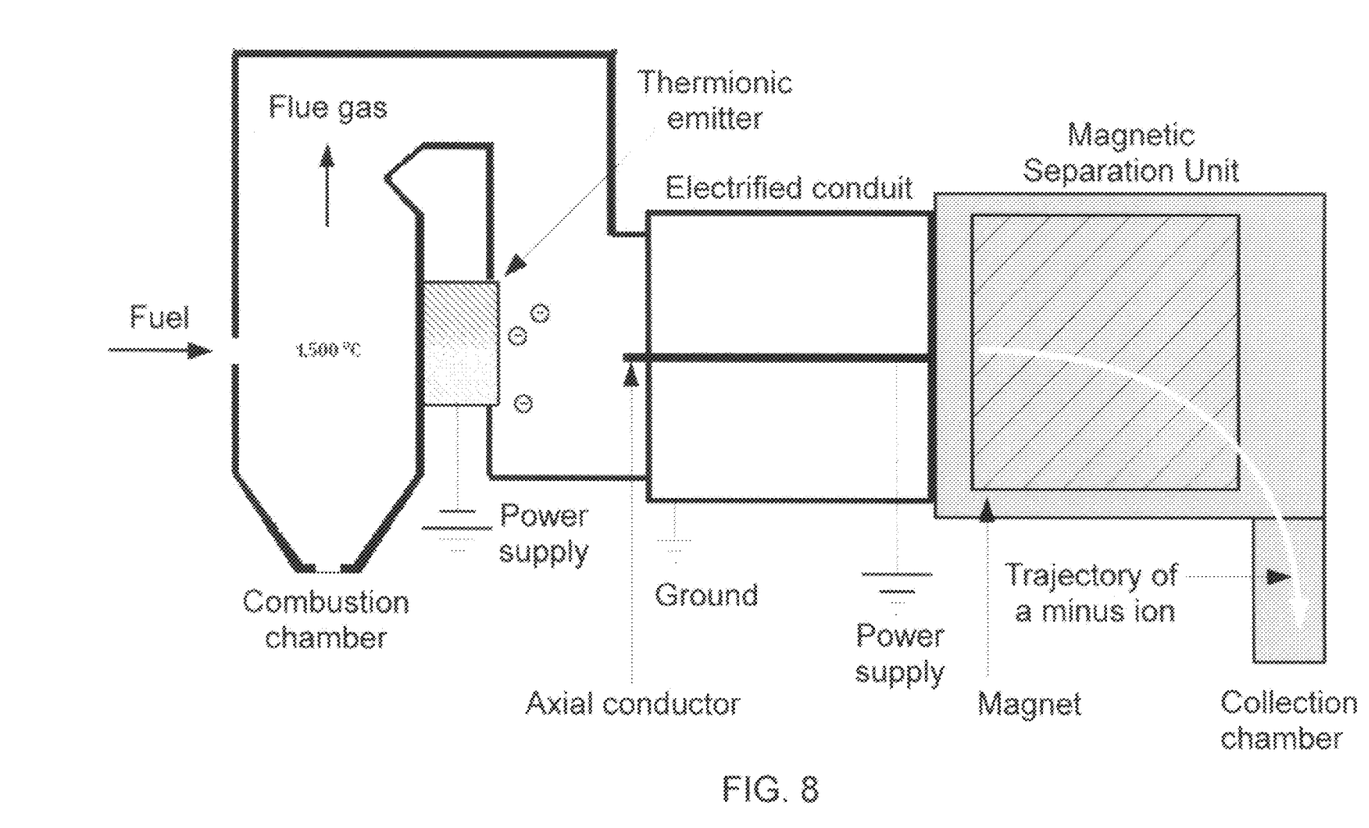
FIG. 8. Schematic layout of an application example where pollutants generated by a power plant are reduced using the proposed method and means.

Objective of this application is to minimize the pollutants and carbon dioxide which are emitted during the combustion of fuels at an electric power plant. Building blocks of the application are schematically illustrated in FIG. 8.
1) A thermionic charging unit provides electrons to the flue gas which charges some of the pollutants that have positive electron affinity.
2) An electrified conduit conveys the flue gas containing the charged pollutants which attract other pollutants to form clusters.
3) Charged clusters are separated from the rest of the gas using a magnetic separation unit and collected into a chamber.
4) Pollutants in the chamber are neutralized via reactions as described above.

Although thermionic charging has been chosen for this application to take advantage of the excess heat available in combustion, charging can be implemented by using electrostatic charging or photocatalytic charging or a combination of various charging methods.

Industrial Application Example 2

Building Ventilation

Figure 9:
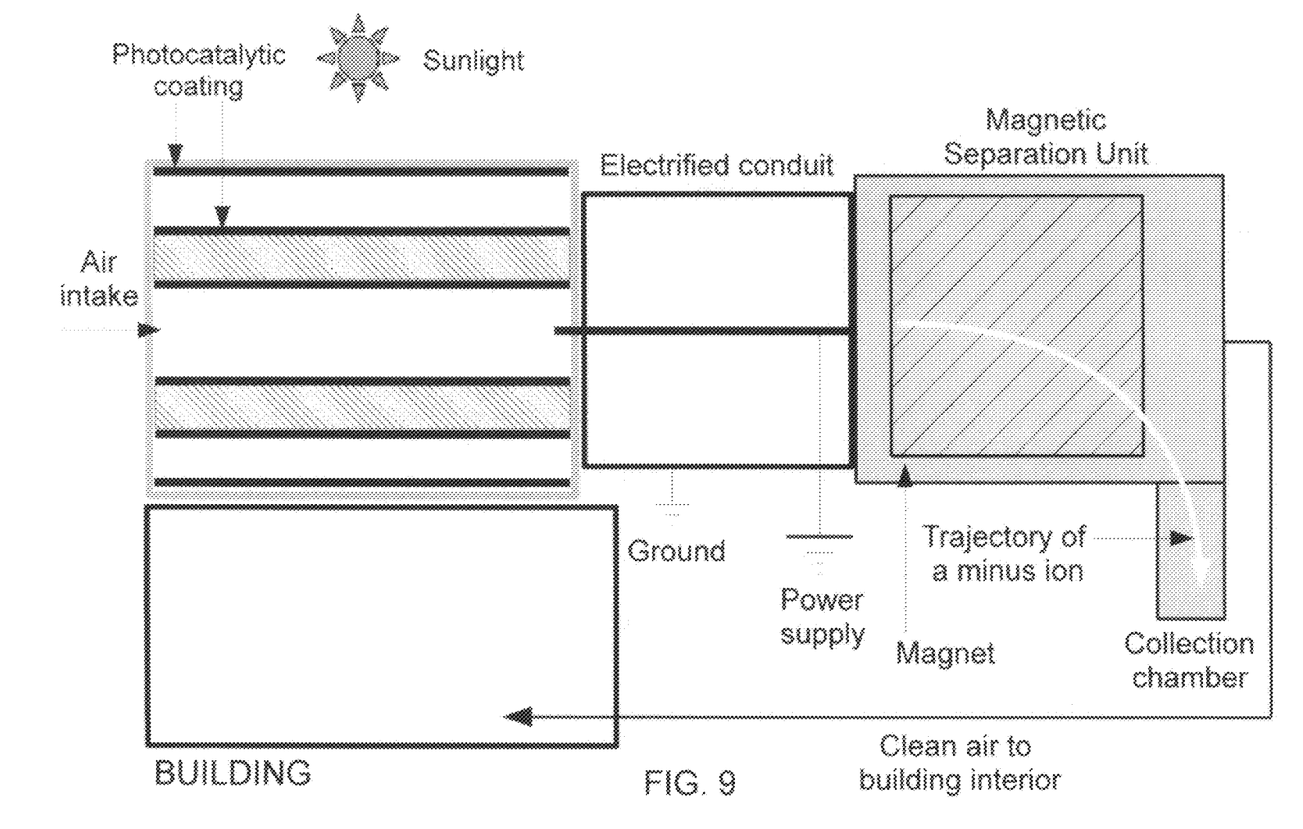
FIG. 9. Schematic layout of an application example where ventilation air of a building is cleaned using the proposed method and means.

Objective of this application is to reduce pollutants in the ventilation air of a building. It is assumed that air intake from outside contains the pollutants which need to be reduced before it is circulated into the building. Building blocks of the application are schematically illustrated in FIG. 9.
1) A photocatalytic charging unit is placed on the roof or a location which is exposed to solar radiation for most of the day. Polluted air is passed over the photocatalytic coating in order to charge some of the pollutants which have positive electron affinity.
2) An electrified conduit conveys the ventilation air containing the charged pollutants which attract other pollutants to form clusters.
3) Charged clusters are separated from the ventilation air using a magnetic separation unit and are collected into a chamber.
4) Pollutants accumulating in the chamber are periodically drained and disposed.

Although photocatalytic charging has been chosen for this application to take advantage of solar radiation, charging can be implemented by using electrostatic charging or thermionic charging or a combination of various charging methods.

REFERENCE SIGNS LIST

Dm: Dipole moment
eA: Electron affinity
ESP: Electrostatic precipitator
IE: Interaction energy
PM: Particulate matter
Qe: Charge of an electron
Qm: Quadrupole moment

CITATION LIST

Patent Literature

U.S. Pat. No. 5,041,271 by Aoki, et al, issued on Aug. 20, 1991
Title: Method of Treating Waste Gas by Irradiation with Electron Beam
U.S. Pat. No. 5,871,703 by Alix, et al, issued on Feb. 16, 1999
Title: Barrier Discharge Conversion of $SO_2$ and $NO_x$ to Acids
U.S. Pat. No. 6,365,112 by Babko-Malyi, et al, issued on Apr. 2, 2002
Title: Distribution of Corona Discharge Activated Reagent Fluid Injected into Electrostatic Precipitators
U.S. Pat. No. 6,387,844 by Fujishima, et al, issued on May 14, 2002
Title: Titanium Dioxide Photocatalyst

NON PATENT LITERATURE

1. "Benchmarking Air Emissions of the 100 Largest Electric Power Producers in the United States" by M. J. Bradley & Associates, 2010
Available at: http://www.ceres.org and http://www.nrdc.org.
2. "Process Optimization Guidance Document for Reducing Mercury Emissions from Coal Combustion in Power Plants" by United Nations Environment Programme, Chemicals Branch, Division of Technology, Industry and Economics, 2010
Available at: http://www.chem.unep.ch/mercury/Sector-Specific-Information/Coal_combustion.htm
or from: United Nations Environment Programme, Geneva, Switzerland
3. "Energy Futures and Urban Air Pollution Challenges for China and the United States" by National Academy of Engineering and National Research Council, 2008
Available at: http://www.nap.edu/catalog/12001.html 4. "The Future of Coal: Options for a Carbon-Constrained World" by Massachusetts Institute of Technology, Cambridge, 2007
Available at http://web.mit.edu/coal/
5. "Coal and Power Systems: Innovations for Existing Plants, Technology Roadmap and Program Plan" by US Department of Energy, Office of Fossil Energy, National Energy Technology Laboratory, 2006
Available at: http://www.netl.doe.gov/technologies/coalpower/ewr/index.html
6. "Proposed Air Pollution Transport Rule" by Environmental Protection Agency, Office of Air and Radiation, Jul. 6, 2010
Available at: http://www.epa.gov/airtransport
7. International Union of Pure and Applied Chemistry Compendium of Chemical Terminology, 2nd Edition, 1997
Available at: http://www.iupac.org/goldbook/E01977.pdf
8. "Discovery and Applications of Photocatalysis" by Japan Nanonet Bulletin, 44th Issue, May 2005
Available at: http://www.nanonet.go.jp/english/mailmag/2005/044a.html

I claim:

1. A method of reducing pollutants in a flue gas by
providing electrons to gas molecules which have positive electron affinity to convert said molecules to negative ions, where said electrons have an average kinetic energy of less than 1 electron volt,
floating said ions through said flue gas without losing acquired electrons,
separating said ions and any pollutants attracted to said ions by applying an electric or a magnetic field or a combination thereof.

2. The method in claim 1 where said electrons are generated by thermionic emission.

3. The method in claim 1 where said electrons are generated by a photocatalyst which is excited by optical radiation.

4. The method in claim 1 where said electrons are generated by an electrical discharge.

5. The method in claim 1, where said flue gas contains pollutants generated during combustion of hydrocarbon fuels.

6. The method in claim 1, where said flue gas contains unburned or partially burned molecules from hydrocarbon fuels.

7. The method in claim 1, where said flue gas is the exhaust of an electric power plant which burns one or a combination of biomass, coal, oil and natural gas.

8. The method in claim 1, where said flue gas is the exhaust of an incinerator which burns waste.

9. An apparatus to reduce pollutants in flue gas of an electric power plant which consists of:
a charging unit which provides electrons to gas molecules which have positive electron affinity to convert them to negative ions,
a conduit which allows said ions to float through said flue gas to attract pollutant molecules,
a separation unit which applies an electric or magnetic field or a combination thereof to said flue gas to remove said ions and any pollutants attracted to said ions.

10. The apparatus in claim 9, where said charging unit consists of a thermionic emitter connected to a power supply.

11. The apparatus in claim 9, where the said charging unit consists of an optically transparent wall inside of which is coated with a photocatalytic material.

12. The apparatus in claim 9, where said charging unit includes one or more lamps which are coated with a photocatalytic material, and said lamps emit optical radiation of energy sufficient to excite said photocatalytic material.

13. The apparatus in claim 9, where the separation unit includes electric or magnetic field generating elements where said electric and magnetic fields apply on said ions a force in a direction different from the flow of the flue gas to separate the ions from the flue gas.

14. The apparatus in claim 9, where said conduit includes electric field generating elements which create an electric force that keeps said ions away from walls of said conduit.

15. An apparatus to reduce pollutants in flue gas of an air ventilation unit which consists of:
a charging unit which provides electrons to gas molecules which have positive electron affinity to convert them to negative ions,
a conduit which allows said ions to float through said flue gas to attract pollutant molecules,
a separation unit which applies an electric or magnetic field or a combination thereof to said flue gas to remove said ions and any pollutants attracted to said ions.

16. The apparatus in claim 15, where said charging unit consists of a thermionic emitter connected to a power supply.

17. The apparatus in claim 15, where the said charging unit consists of an optically transparent wall inside of which is coated with a photocatalytic material.

18. The apparatus in claim 15, where said charging unit includes one or more lamps which are coated with a photocatalytic material, and said lamp(s) emit optical radiation of energy sufficient to excite said photocatalytic material.

19. The apparatus in claim 15, where the separation unit includes electric or magnetic field generating elements where said electric and magnetic fields apply on said ions a force in a direction different from the flow of the flue gas to separate the ions from the flue gas.

20. The apparatus in claim 15, where said conduit includes electric field generating elements which create an electric force that keeps said ions away from walls of said conduit.

* * * * *